(12) United States Patent
Yu et al.

(10) Patent No.: US 9,752,963 B2
(45) Date of Patent: Sep. 5, 2017

(54) SUSPENSION DAMPER TEST APPARATUS, CONTROL SYSTEM AND METHOD OF CONTROLLING A SUSPENSION DAMPER TEST APPARATUS

(71) Applicant: Honda Motor Co., Ltd., Minato-ku, Tokyo (JP)

(72) Inventors: Jinghong Yu, Dublin, OH (US); Kirk Rhoades, Dublin, OH (US); Keith Malarik, Delaware, OH (US)

(73) Assignee: HONDA MOTOR CO., LTD, Tokyo (JP)

( * ) Notice: Subject to any disclaimer, the term of this patent is extended or adjusted under 35 U.S.C. 154(b) by 289 days.

(21) Appl. No.: 14/513,858

(22) Filed: Oct. 14, 2014

(65) Prior Publication Data

US 2016/0103041 A1 Apr. 14, 2016

(51) Int. Cl.
*G01M 17/04* (2006.01)
(52) U.S. Cl.
CPC .................................. *G01M 17/04* (2013.01)
(58) Field of Classification Search
CPC .............................. G01M 17/04; G01M 7/00
See application file for complete search history.

(56) References Cited

U.S. PATENT DOCUMENTS

| | | | |
|---|---|---|---|
| 2,723,553 A * | 11/1955 | Onions | G01M 17/04 73/11.04 |
| 3,427,860 A | 2/1969 | Kelly | |
| 3,811,316 A | 5/1974 | Amendolia | |
| 4,003,247 A * | 1/1977 | Moser | G01N 3/38 73/814 |
| 4,103,532 A * | 8/1978 | Buzzi | G01M 17/04 73/11.08 |
| 5,241,856 A * | 9/1993 | Petersen | G01M 13/027 73/115.07 |
| 5,396,973 A * | 3/1995 | Schwemmer | F16F 9/38 188/266.2 |
| 5,487,301 A * | 1/1996 | Muller | G01M 17/04 73/116.01 |
| 5,567,866 A | 10/1996 | Popp | |

(Continued)

FOREIGN PATENT DOCUMENTS

| CN | 102023099 A | 4/2011 |
|---|---|---|
| CN | 201885885 U | 6/2011 |

*Primary Examiner* — Freddie Kirkland, III
(74) *Attorney, Agent, or Firm* — Arent Fox LLP

(57) ABSTRACT

A suspension damper test apparatus is provided. The suspension damper test apparatus includes a first fixture having a force sensor, a first prying device, and a first torsion device, operatively coupled to a first end of a suspension damper. A second fixture having at least one of a displacement sensor and a speed sensor, is operatively coupled to a second end of a suspension damper. A controller is in signal communication with the force sensor and the at least one of the displacement sensor and the speed sensor. The controller is configured to record signals received from one or more of the force sensor, and the at least one of the displacement sensor and the speed sensor. The signals recorded are representative of a friction of the suspension damper while the suspension damper is actuated along a longitudinal axis of the suspension damper.

25 Claims, 10 Drawing Sheets

(56) References Cited

U.S. PATENT DOCUMENTS

| | | | |
|---|---|---|---|
| 5,942,673 A * | 8/1999 | Horiuchi | G01M 17/007 73/11.04 |
| 5,952,582 A * | 9/1999 | Akita | G01N 3/32 73/805 |
| 6,253,620 B1 | 7/2001 | Yamashita | |
| 6,640,638 B1 * | 11/2003 | Haeg | G01M 17/04 73/116.01 |
| 6,782,731 B2 | 8/2004 | Lee | |
| 6,786,074 B1 | 9/2004 | Campuzano | |
| 7,047,791 B2 | 5/2006 | Abe | |
| 7,942,046 B2 | 5/2011 | Jones | |
| 8,935,955 B2 * | 1/2015 | Preising | G01M 13/027 73/117.03 |
| 9,128,003 B2 * | 9/2015 | Preising | G01M 17/007 |
| 2008/0275681 A1 * | 11/2008 | Langer | G01M 17/04 703/8 |
| 2013/0312507 A1 * | 11/2013 | Preising | G01M 17/007 73/116.01 |

\* cited by examiner

SUSPENSION DAMPER TEST APPARATUS, CONTROL SYSTEM AND METHOD OF CONTROLLING A SUSPENSION DAMPER TEST APPARATUS

BACKGROUND

The subject matter disclosed herein relates to a suspension damper test apparatus and systems and methods for controlling a suspension damper test apparatus and, more particularly, to a suspension damper test apparatus for characterizing the properties of suspension dampers.

One common application of suspension dampers is to attenuate vibration in a vehicle body and suspension. The thorough understanding of the behavior and characterizations of a suspension damper in a suspension system allows for robust and reliable designs. One characteristic of a suspension damper that may be useful for modeling an application is the friction of actuating a suspension damper. The friction characteristics of a suspension damper may affect the performance and/or the durability of the suspension damper.

One method known in the art of characterizing the friction of a suspension damper includes a test apparatus that secures the ends of the suspension damper and actuates the suspension damper between an extended position and a compressed position. One or more loads are applied to a side of the suspension damper while the suspension damper is actuated. The side loads are perpendicular to an axis of actuation. The response forces of the suspension damper are recorded and a friction value is calculated.

There are several significant drawbacks to the conventional methods and apparatus. First, the side force from the application of the side load does not exist in a realistic configuration of a vehicle suspension system using suspension dampers. This results in a test set-up that is not replicating the actual configuration of a suspension damper in a suspension system. Second, the test apparatus set-up and applied side loads cause excessive artificial deflection of the suspension damper, which can negatively affect the repeatability of the measurements.

A suspension damper test apparatus and a control system for a suspension damper test apparatus configured to provide accurate and repeatable results that replicate the actual configuration of a suspension damper in a suspension system is desirable.

SUMMARY

According to one aspect, a suspension damper test apparatus includes a first fixture having a force sensor, a first prying device, and a first torsion device, operatively coupled to a first end of a suspension damper. A second fixture having at least one of a displacement sensor and a speed sensor, is operatively coupled to a second end of a suspension damper. A controller is in signal communication with the force sensor and the at least one of the displacement sensor and the speed sensor. The controller is configured to record signals received from one or more of the force sensor and the at least one of the displacement sensor and the speed sensor. The signals recorded are representative of a friction of the suspension damper while the suspension damper is actuated along a longitudinal axis of the suspension damper.

According to another aspect, a method for controlling a suspension damper test apparatus is provided. The method includes coupling a first end of a suspension damper to a first fixture of the suspension damper test apparatus. The first fixture includes a force sensor, a first prying device, and a first torsion device. A second end of the suspension damper is coupled to a second fixture of the suspension damper test apparatus. The second fixture includes a second prying device, a second torsion device and at least one of a displacement sensor and a speed sensor. A first bushing inner tube is tilted and rotated relative to a first bushing outer tube by the first prying device and the first torsion device. A second bushing inner tube is tilted and rotated relative to a second bushing outer tube in the second end of the suspension damper by the second prying device and the second torsion device. An actuator moves the suspension damper between an extended position and a compressed position in one of a sinusoidal wave form and a triangle wave form. A controller is in signal communication with the force sensor and the at least one of the displacement sensor and the speed sensor, and receives at least one signal from at least one of the force sensor and the at least one of the displacement sensor and the speed sensor. The controller characterizes at least one friction value of the suspension damper based, at least in part, on the at least one signal deceived by the controller.

According to a further aspect, a control system for a suspension damper test apparatus includes a suspension damper test apparatus and a controller. The suspension damper test apparatus includes a first fixture, a second fixture, and an actuator. The first fixture including a force sensor, a first prying device, and a first torsion device is operatively coupled to a first end of a suspension damper. The second fixture including a second prying device, a second torsion device, and at least one of a displacement sensor and a speed sensor, is operatively coupled to a second end of the suspension damper. The actuator actuates the suspension damper between an extended position and a compressed position in one of a sinusoidal wave form and a triangle wave form. The controller is in signal communication with the suspension damper test apparatus. The controller is configured to record signals from one or more of the force sensor and the at least one of the displacement sensor and the speed sensor, representative of a friction of the suspension damper while the suspension damper is actuated along a longitudinal axis of the suspension damper.

According to a further aspect, a suspension damper test apparatus includes a first fixture having a force sensor and a prying device operatively coupled to a first end of a suspension damper. A second fixture having a torsion device and at least one of a displacement sensor and a speed sensor is operatively coupled to a second end of a suspension damper. A controller is in signal communication with the force sensor and the displacement sensor and/or the speed sensor. The controller is configured to record signals received from one or more of the force sensor and the displacement sensor and/or the speed sensor. The signals recorded are representative of a friction of the suspension damper while the suspension damper is actuated along a longitudinal axis of the suspension damper.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

Figure 1:
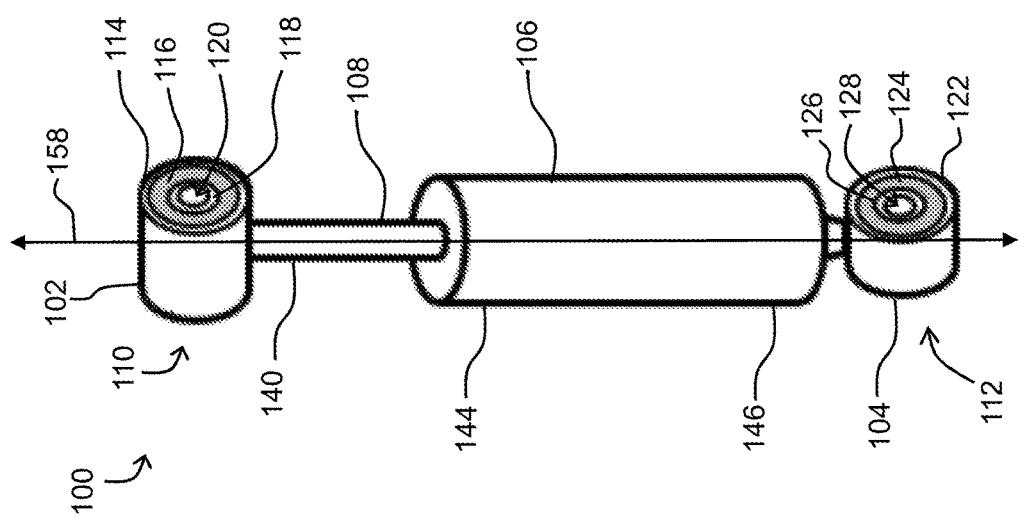
FIG. 1 is an isometric representation of an exemplary suspension damper.
Figure 2:
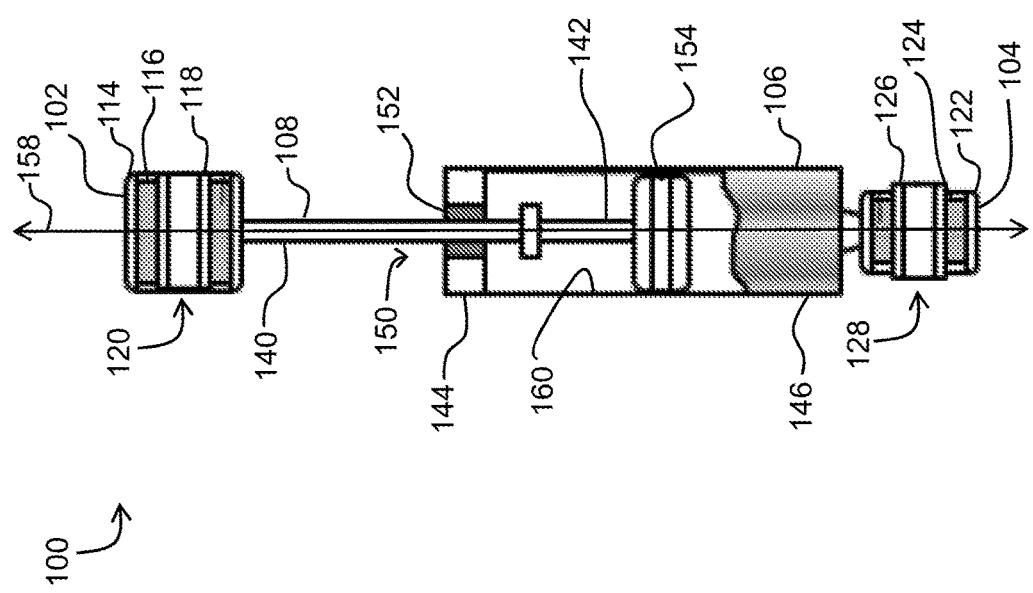
FIG. 2 is a partial cut away side view of the suspension damper of FIG. 1.

Referring initially to FIGS. 1 and 2, an exemplary suspension damper 100 is shown. The suspension damper 100 includes a first end 102 and an opposite second end 104. A cylinder portion 106 and a rod portion 108 operatively couple the first end 102 to the second end 104. The first end 102 includes a first bushing 110 for operatively coupling the first end 102 to a suspension system or other various applications. The second end 104 includes a second bushing 112 for operatively coupling the second end 104 to a suspension system or other various applications. The first bushing 110 includes a cylindrical first bushing outer tube 114. Disposed within the first bushing outer tube 114 is a resilient cylindrical bushing material 116. A cylindrical first bushing inner tube 118 is disposed within the resilient cylindrical bushing material 116 and defines a first passage 120. The second bushing 112 includes a cylindrical second bushing outer tube 122. Disposed within the second bushing outer tube 122 is a resilient cylindrical bushing material 124. A cylindrical second bushing inner tube 126 is disposed within the resilient cylindrical bushing material 124 and defines a second passage 128.

Still referring to FIGS. 1 and 2, an upper end 140 of the rod portion 108 is coupled to the first bushing outer tube 114. A lower end 142 of the rod portion 108 is disposed within the cylinder portion 106 of the suspension damper 100. The cylinder portion 106 includes a first or upper end 144 and an opposing second or lower end 146. The second bushing outer tube 122 is coupled to the lower end 146 of the cylinder portion 106. The upper end 144 of cylinder portion 106 defines an aperture 150. A cylindrical resilient seal 152 is disposed within the aperture 150 and the rod portion 108 passes through the seal 152 into the cylinder portion 106. Disposed on the lower end 142 of the rod portion 108 is a piston 154. When the suspension damper 100 is actuated, the rod portion 108 moves along a central longitudinal axis 158 of the suspension damper 100. During actuation, the piston 154 frictionally interferes with, such as rubs against, an inner surface of the cylinder portion 106 and the rod portion 108 frictionally interferes with, such as rubs against, the seal 152.

It is contemplated that the suspension damper 100 may include many different features and/or components well understood to one having ordinary skill in the art that are not disclosed or shown in FIGS. 1 and 2. For example, common suspension dampers 100 may include fluid and/or gas within the cylinder portion 106. In some embodiments, an external reservoir containing fluid and/or gas is in fluid communication with an inner volume of the cylinder portion 106. In certain embodiments, valves or passageways allow fluid and/or gas to pass from one side of the piston 154 to the other side during actuation of the suspension damper 100. Suspension dampers are well know to have many different operative embodiments that would function within the methods and apparatus disclosed herein. It is also contemplated that the materials used for the resilient bushing material may be the same or different depending on the specific application. Also, the dimensions of the inner and outer tubes and the orientation of a suspension damper relative to the application are well known to someone having ordinary skill in the art.

Figure 3:
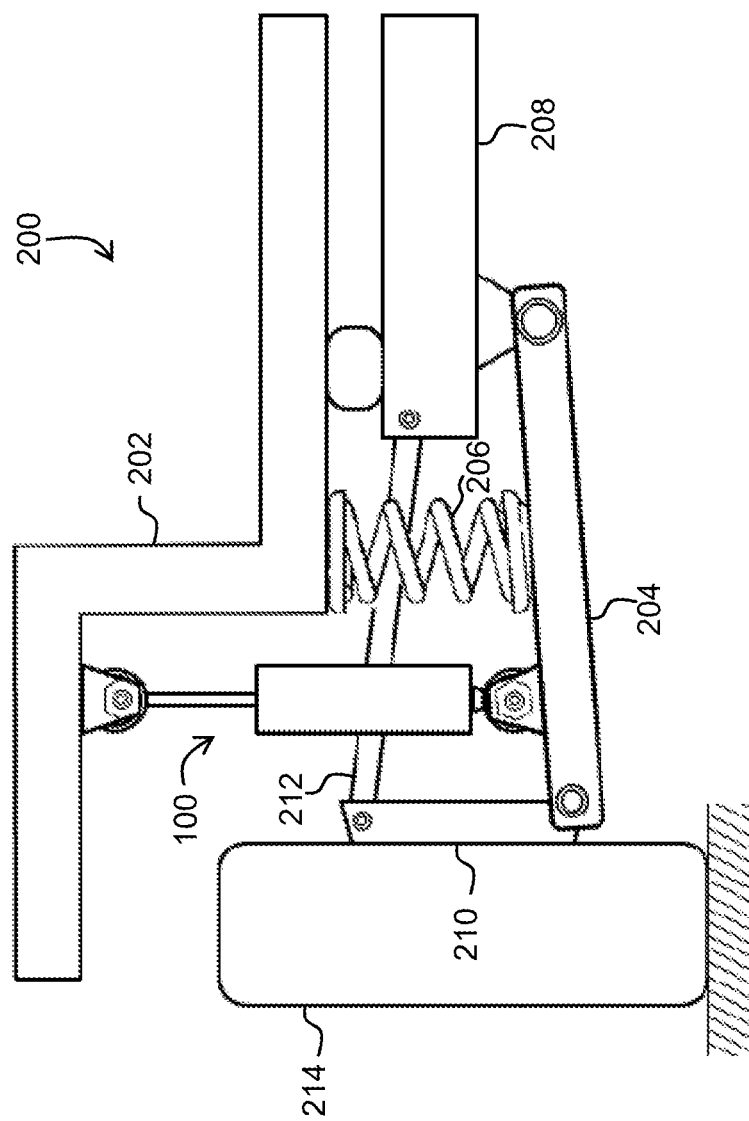
FIG. 3 is a representation of a suspension system of a vehicle including the suspension damper of FIG. 1 in a neutral position.
Figure 4:
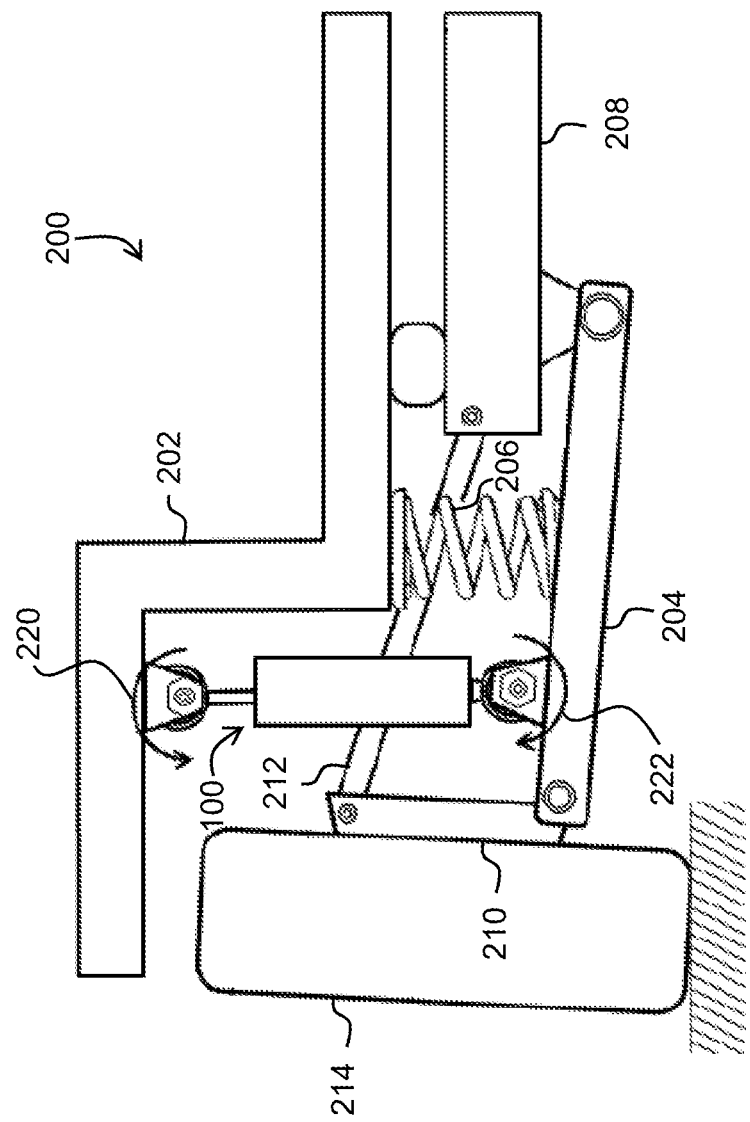
FIG. 4 is a representation of the suspension system of FIG. 3 including the suspension damper of FIG. 1 in a compressed position.
Figure 5:
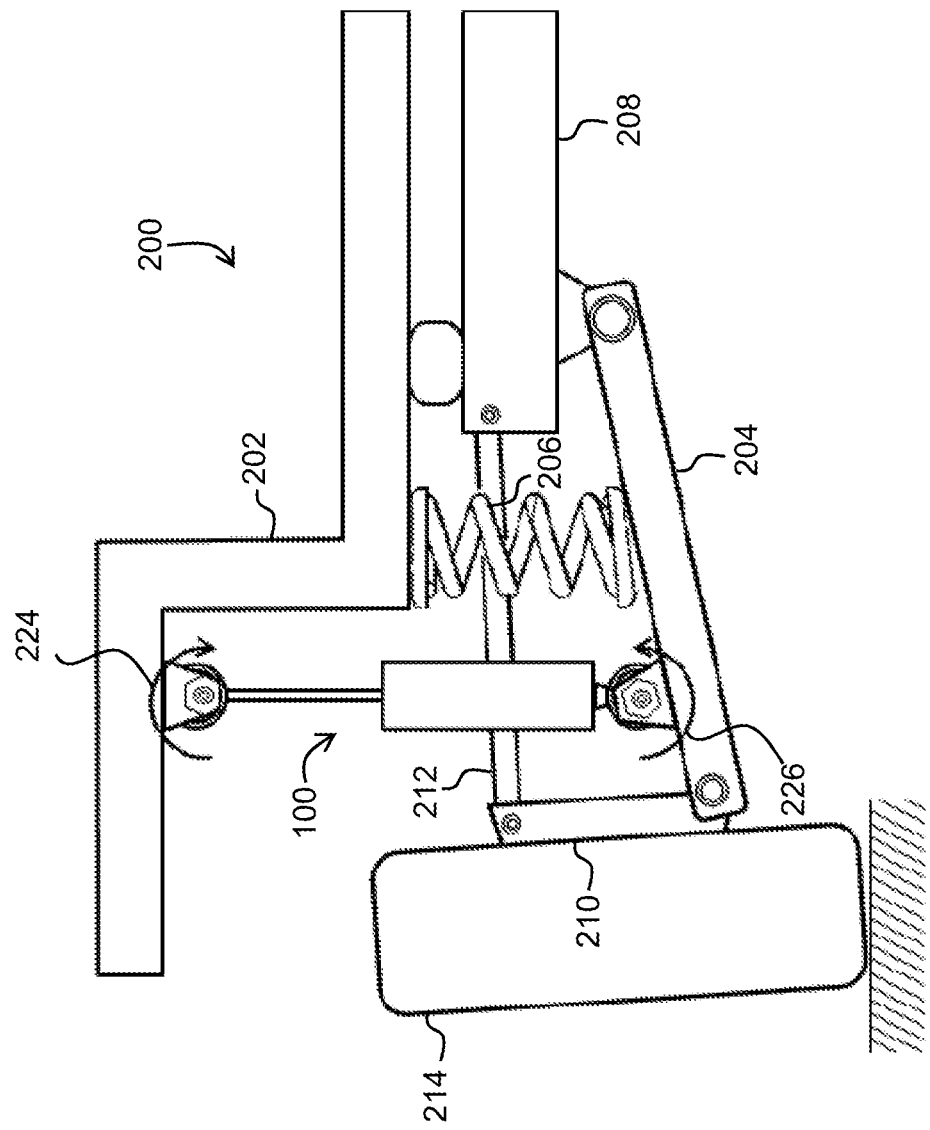
FIG. 5 is a representation of the suspension system of FIG. 3 including the suspension damper of FIG. 1 in an extended position.

Now turning to FIGS. 3-5, a portion of an exemplary suspension system 200 in several positions is disclosed. FIG. 3 depicts the suspension system 200 in a neutral position, for example when a vehicle is parked. The suspension system 200 includes the suspension damper 100 mounted between a portion of the vehicle body 202 and a lower control arm 204. The suspension system 200 also includes a spring 206 mounted between the body 202 and the lower control arm 204. The lower control arm 204 is pivotally coupled to a sub-frame assembly 208 and a knuckle 210. The suspension system 200 also includes an upper control arm 212 that is pivotally coupled to the sub-frame assembly 208 and the knuckle 210. A wheel and tire assembly 214 is operatively coupled to the knuckle 210.

It is contemplated that suspension systems may take on many different configurations and include many different components. One having ordinary skill in the art would understand that the suspension damper 100 could be applied to attenuate vibrations as a component of a variety of suspension systems.

Now turning to FIG. 4, the wheel and tire assembly 214 is depicted in an upward travel position from the neutral position depicted in FIG. 3, which results in compression of the suspension damper 100. The articulation of the suspension system 200 changes the position of the lower control arm 204 and the upper control arm 212 relative to the suspension damper 100 and the body 202. The change in positions results in the creation of a bending moment M1 (indicated by directional arrow 220) at the first bushing 110 and a bending moment M2 (indicated by directional arrow 222) at the second bushing 112. Bending moment M1 and bending moment M2 may not be in the same plane depending on the geometry of the suspension system 200 and the relative changes between the lower control arm 204, the upper control arm 212, and the body 202.

Now turning to FIG. 5, the wheel and tire assembly 214 is depicted in a downward travel position from the neutral position depicted in FIG. 3, which results in extension of the suspension damper 100. As in the position shown in FIG. 4, the articulation of the suspension system 200 changes the position of the lower control arm 204 and the upper control arm 212 relative to the suspension damper 100 and the body 202. The change in positions results in the creation of a bending moment M3 (indicated by directional arrow 224) at the first bushing 110 and a bending moment M4 (indicated by directional arrow 226) at the second bushing 112. Bending moment M3 and bending moment M4 may not be in the same plane for the same reasons given above.

Figure 6:
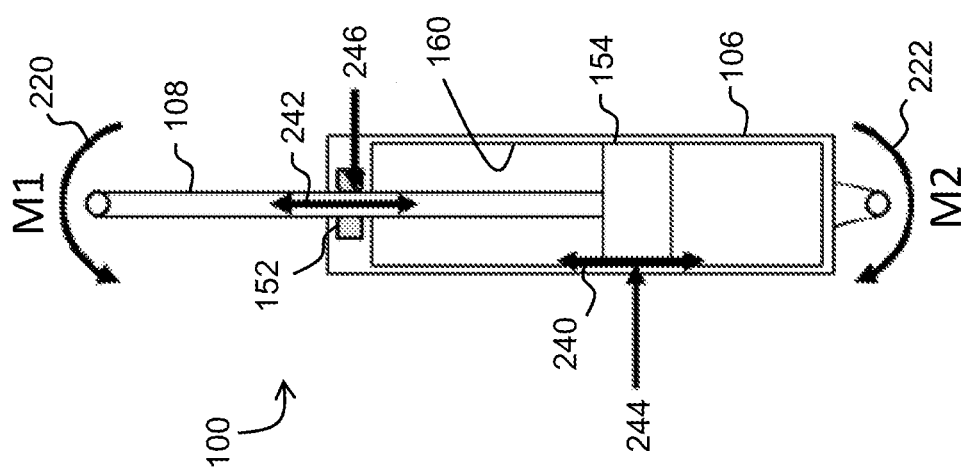
FIG. 6 is a cross-sectional view of a portion of the suspension damper of FIG. 1.

Now turning to FIG. 6, a cross-sectional view of a portion of the suspension damper 100 is depicted. During actuation of the suspension damper 100, frictional forces are generated between the interfaces of the cylinder portion 106 and the rod portion 108. More specifically, the rubbing or sliding of the piston 154 along the inner surface 160 of the cylinder portion creates a frictional force represented by arrow 240. The rubbing or sliding of the rod portion 108 against the seal 152 also creates a frictional force represented by the arrow 242. If the suspension damper 100 were actuated in isolation for external influences, the total frictional force would be the sum of the frictional force 240 and the frictional force 242. However, as shown in FIGS. 4 and 5, when actuated as a component of a suspension system 200, bending moments M1, M2, M3, M4 are generated at the ends of the suspension damper 100. Arrows 220, 222 depict the bending moments M1 and M2 in FIG. 6. The bending moments M1 and M2 create normal forces 244, 246 acting between the inner surface 160 of the cylinder portion 106 and the piston 154 and between the rod portion 108 and the seal 152, respectively. The normal forces 244, 246 are proportional to the bending moments M1, M2, M3, M4 generated during movement of the suspension system 200. The frictional force 240 is dependent on the normal force 244 and the frictional force 242 is dependent on the normal force 246. The total friction of the suspension damper 100 is the sum of the frictional forces 240 and 242. Thus, the total friction force of the suspension damper 100 may change as the suspension system 200 is articulated during use.

Figure 7:
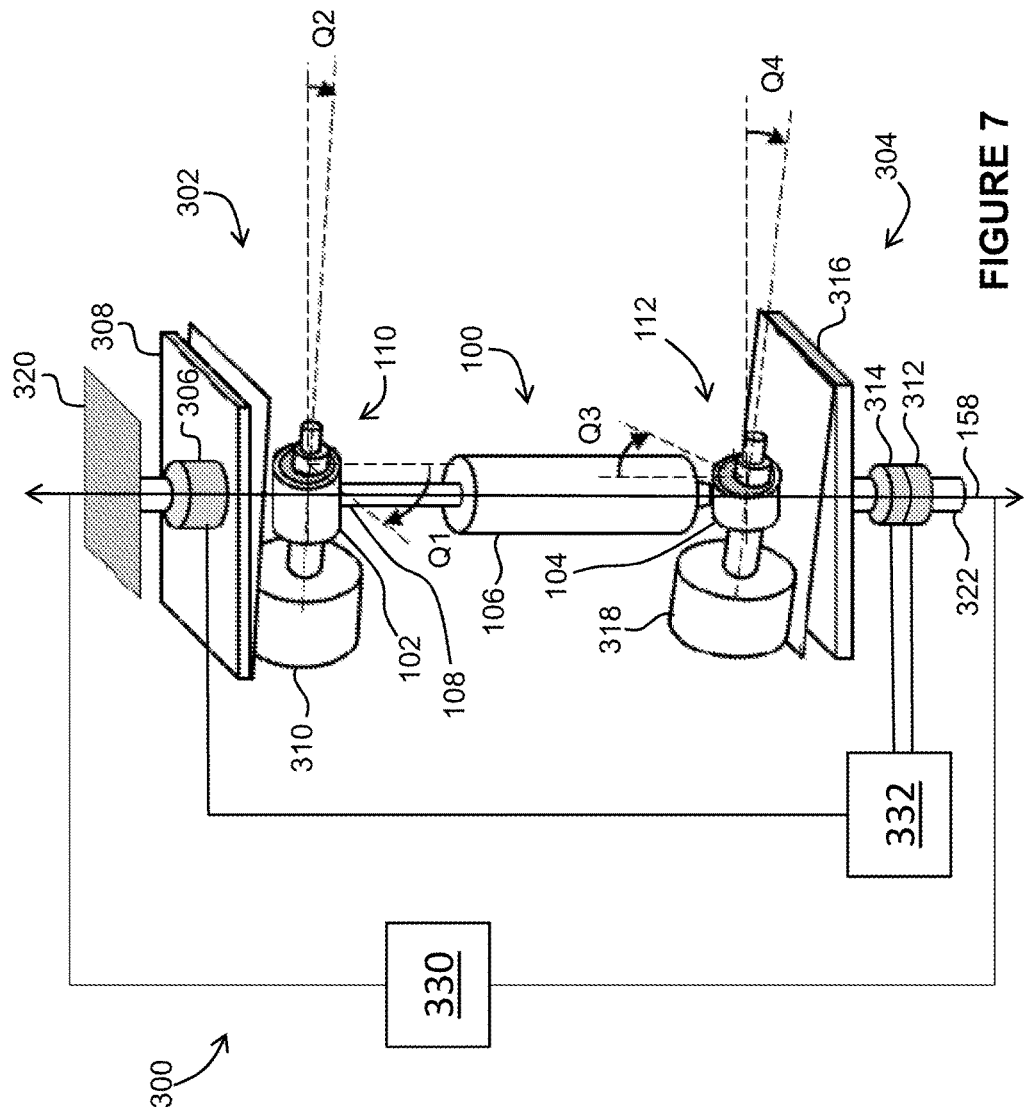
FIG. 7 is an isometric representation of a portion of a suspension damper test apparatus.

Now turning to FIG. 7, an exemplary suspension damper test apparatus 300 for testing the suspension damper 100 is depicted. The suspension damper test apparatus 300 includes a first fixture 302 and a second fixture 304. The first end 104 of the suspension damper 100 is coupled to the first fixture 302. The second end 106 of the suspension damper 100 is coupled to the second fixture 304. The first fixture 302 includes a force sensor 306, a first prying device 308, and a first torsion device 310. In one embodiment, the second fixture 304 includes a displacement sensor 312, a speed sensor 314, a second prying device 316, and a second torsion device 318. It is contemplated that in certain embodiments of the suspension damper test apparatus 300, the second fixture 304 includes the second prying device 316, the second torsion device 318, and at least one of the displacement sensor 312 and the speed sensor 314, e.g., the displacement sensor 312 and/or the speed sensor 314. In the embodiment shown in FIG. 7, the first fixture 302 is coupled to a fixed frame 320, of which a portion is depicted, and the second fixture 304 is coupled to a moveable portion of a frame 322 allowing motion to be imparted along the longitudinal axis 158 of the suspension damper 100. The motion imparted on the second fixture 304 to actuate the suspension damper 100 is provided by an actuator, such as an external actuator 330, which is depicted schematically in FIG. 7. The suspension damper test apparatus 300 also includes a controller 332, which is also depicted schematically in FIG. 7. The controller 332 is in signal communication with the force sensor 306, the displacement sensor 312, the speed sensor 314, and the external actuator.

Certain embodiments of the suspension damper test apparatus 300 may include different combinations of prying devices and/or torsion devices. In one embodiment, the first fixture 302 includes all the components as shown in FIG. 7. The second fixture 304 includes at least one of the displacement sensor 312 and the speed sensor 314, and does not include one or more of the second prying device 316 and the second torsion device 318. It is contemplated that the second end 104 of the suspension damper 100 may be coupled directly to the moveable portion of the frame 322. It is also contemplated that in certain embodiments, the first fixture 302 includes a first torsion device 310 without a prying device and the second fixture 304 includes a first prying device 308 without a torsion device. It is contemplated that the overall configuration of the suspension damper test apparatus 300 can include different combinations of the torsion devices and the prying devices, and/or different orientations of the suspension damper 100, as required to simulate any configuration of the suspension system 200.

Still referring to FIG. 7, in one embodiment, a method of testing a suspension damper 100 includes operatively coupling the first end 102 of the suspension damper 100 to the first fixture 302 of the suspension damper test apparatus 300. Specifically, the first bushing 110 of suspension damper 100 is operatively coupled to the first torsion device 310, which is coupled to the first prying device 308. The second end 104 of the suspension damper 100 is operatively coupled to the second fixture 304 of the suspension damper test apparatus 300. Specifically, the second bushing 112 of suspension damper 100 is operatively coupled to the second torsion device 318, which is coupled to the second prying device 316. The first torsion device 310 rotates the first bushing inner tube 118 to a torsion angle Q1 relative to the first bushing outer tube 114. The first prying device 308 tilts the first torsion device 310 resulting in the first bushing inner tube 118 tilting to a prying angle Q2 relative to the first bushing outer tube 114. Similarly, the second torsion device 318 rotates the second bushing inner tube 126 to a torsion angle Q3 relative to the second bushing outer tube 122 and the second prying device 316 tilts the second torsion device 318 resulting in the second bushing inner tube 126 tilting to a prying angle Q4 relative to the second bushing outer tube 122. The external actuator 330 then applies a slow actuation motion along the longitudinal axis 158 of the suspension damper 100. The motion may be in a sinusoidal waveform or a triangle waveform. The motion actuates the suspension damper 100 and moves the rod portion 108 relative to the cylinder portion 106. The controller 332 records one or more signals received from one or more of the force sensor, the displacement sensor, and/or the speed sensor in signal communication with the controller 332. The signals received by the controller 332 may then be used to at least partially characterize the friction of the suspension damper 100.

The tilting and rotating of the inner tubes 118, 126 relative to the outer tubes 114, 122, respectively, allow the suspension damper test apparatus 300 to apply bending moments to the first bushing 110 and the second bushing 112 as a suspension system would in an actual application. The maximum torsion angle and prying angles may be determined by either computer-aided design tools or actual measurements taken from the suspension damper 100 under full compression and full extension. By using this apparatus and method of testing, the repeatability of the results is greatly improved over the conventional apparatus and methods. Also, the contribution of the apparatus to the test results is significantly reduced over the conventional apparatus and methods allowing for more accurate characterization of the suspension damper 100.

It is contemplated that the embodiment depicted in FIG. 7 may be modified. In certain embodiments, the orientation of the suspension damper may be reversed. Also, the first fixture 302 may be the moveable fixture and the second fixture 304 may be the stationary or fixed fixture. Also, the orientation of the prying devices 308, 316 and the torsion devices 310, 318 do not have to be in a single plane. In some embodiments, the first prying device 308 is rotated relative to the second prying device 316 and the first torsion device 310 is also rotated relative to the second torsion device 318. In certain embodiments, the first prying device 308 is rotated relative to the first torsion device 310 and the second prying device 316 is rotated relative to the second torsion device 318. It is also contemplated that one of the first end 102 and the second end 104 of the suspension damper 100 may be coupled to the suspension damper test apparatus 300 as described above and the opposing end is couple using a fixed coupling (not shown) not including a prying or torsion device.

Figure 8:
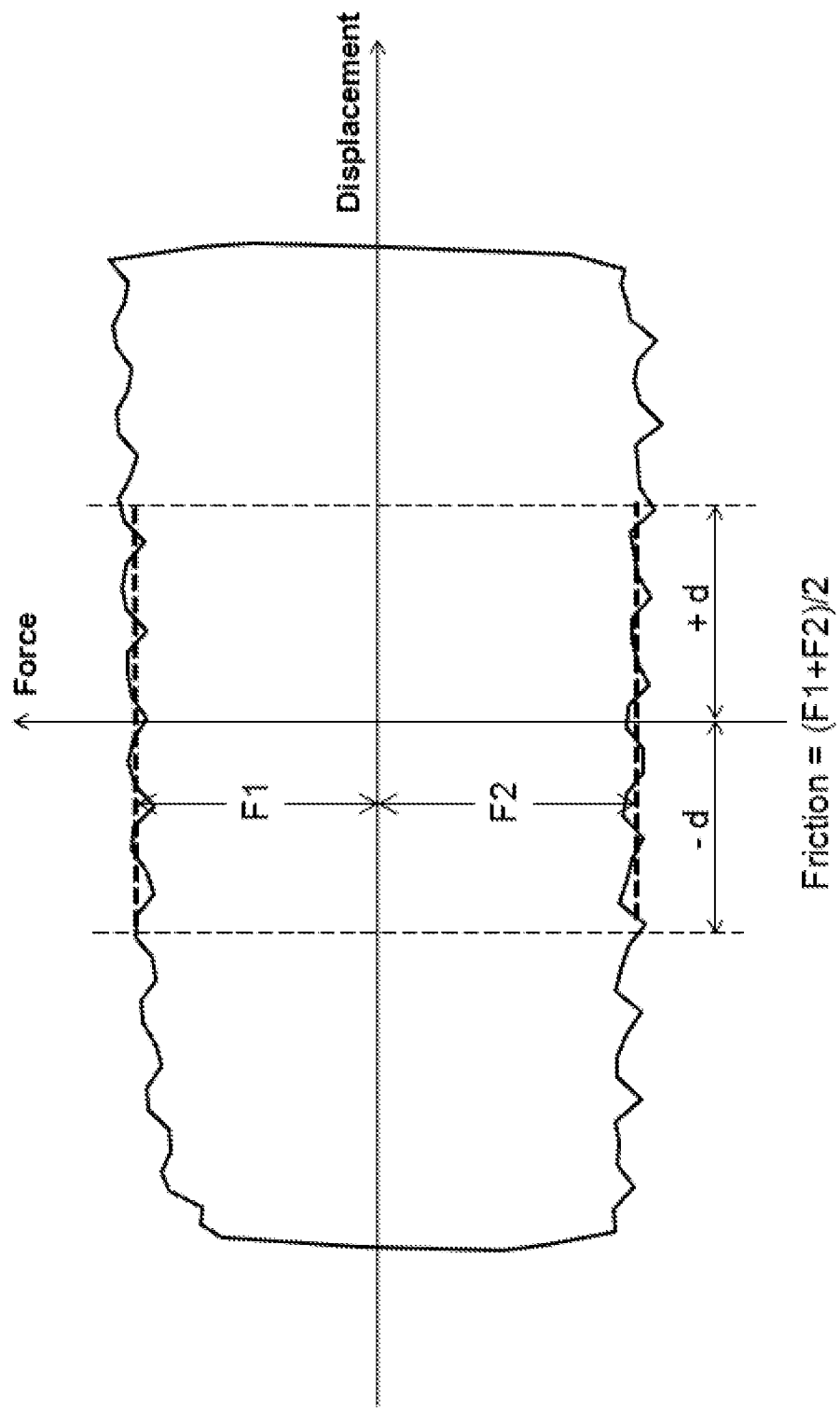
FIG. 8 is a chart depicting exemplary output recorded by the suspension damper test apparatus of FIG. 7.

Now referring to FIG. 8, the one or more signals received from the force sensor 306 and/or the displacement sensor 312 may be plotted to demonstrate how the friction of a suspension damper 100 may be determined. A region of +d to −d is determined. In one embodiment, d equals 1 millimeter (mm). In an alternative embodiment, d equals 2 mm. It is contemplated that the value of d may be any dimension that is representative of the suspension damper 100 being tested and the application characteristics. F1 and F2 are the average compression and extension forces over the distance +d to −d. Thus, the friction of the suspension damper 100 is the sum of F1 and F2 divided by two. It is contemplated that other methods of using the data collected by the suspension damper test apparatus 300 may be used in certain embodiments.

Figures 9, 10:
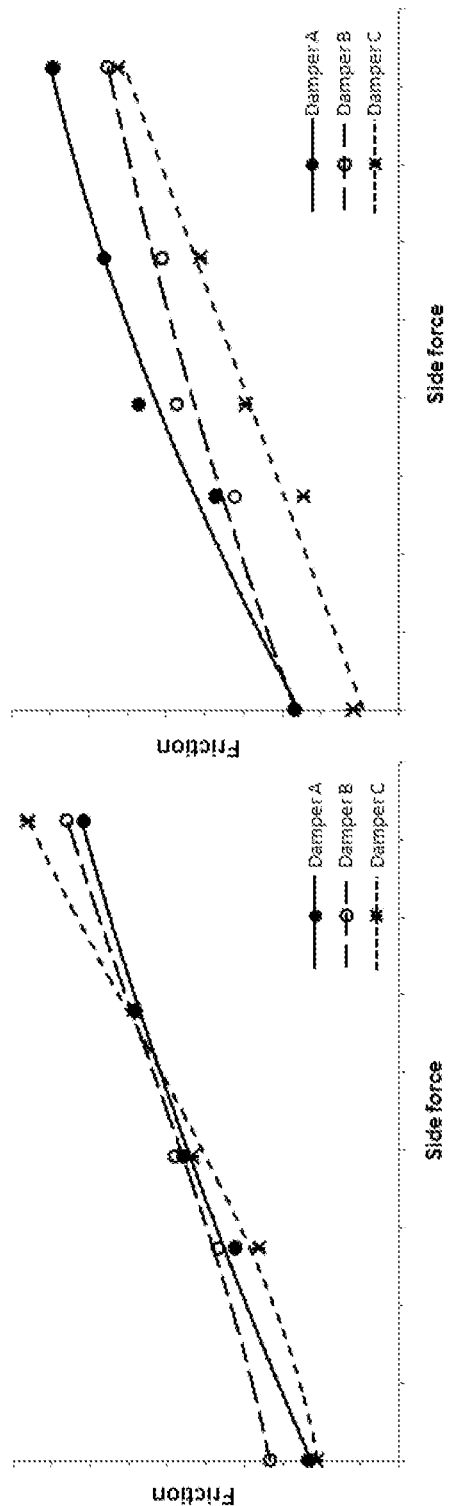
FIGS. 9 and 10 depict suspension damper friction values calculated using conventional test apparatus and methods.

Now referring to FIGS. 9 and 10, charts depicting friction values from three suspension dampers tested using conventional side-load methods and apparatus are shown. FIG. 9 represents five different side loads applied to the dampers under test and the friction values calculated therefrom. FIG. 10 shows the results of repeating the same tests on the same dampers from FIG. 9. One having ordinary skill in the art can plainly see that the repeatability of the conventional method and apparatus is poor.

Figures 11, 12:
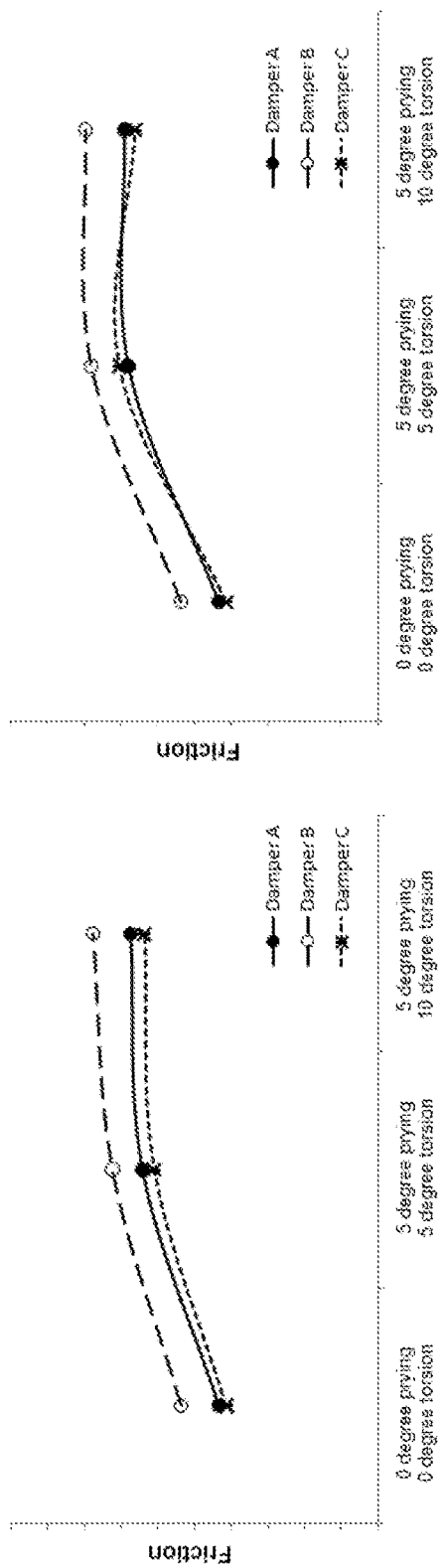
FIGS. 11 and 12 depict suspension damper friction values calculated using the suspension damper test apparatus of FIG. 7 and methods disclosed herein.

Now referring to FIGS. 11 and 12, charts depicting friction values from three suspension dampers tested using the exemplary suspension damper test apparatus 300 depicted in FIG. 7 and the method described above are shown. FIG. 11 shows the results of three different combinations of prying and torsion angles. Increasing the prying and torsion angles generally results in increasing the friction values calculated. This result corresponds directly with the model of the bending moments M1, M2, M3, M4 contributing to the friction forces of the suspension damper during actuation. The results shown in the charts in FIGS. 11 and 12 demonstrate the significant improvement in repeatability provided by the suspension damper test apparatus 300 and the method disclosed herein over the conventional methods and apparatus.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

What is claimed is:

1. A suspension damper test apparatus comprising:
a first fixture including a force sensor, a first prying device, and a first torsion device, operatively coupled to a first end of a suspension damper;
a second fixture including a second prying device, a second torsion device, and at least one of a displacement sensor and a speed sensor, operatively coupled to a second end of the suspension damper; and
a controller in signal communication with the force sensor and the at least one of the displacement sensor and the speed sensor, the controller configured to record signals received from one or more of the force sensor and the at least one of the speed sensor and the displacement sensor, representative of a friction of the suspension damper while the suspension damper is actuated along a longitudinal axis of the suspension damper.

2. The suspension damper test apparatus of claim 1, wherein the first prying device and the first torsion device are configured to tilt and rotate a first bushing inner tube relative to a first bushing outer tube at the first end of the suspension damper.

3. The suspension damper test apparatus of claim 2, wherein the second prying device and the second torsion device tilt and rotate a second bushing inner tube relative to a second bushing outer tube at the second end of the suspension damper.

4. The suspension damper test apparatus of claim 3, further comprising an actuator that actuates the suspension damper between an extended position and a compressed position in one of a sinusoidal wave form and a triangle wave form.

5. The suspension damper test apparatus of claim 4, wherein the first fixture is a stationary fixture and the second fixture is a moveable fixture, the actuator acting on the second fixture.

6. The suspension damper test apparatus of claim 4, wherein the second fixture is a stationary fixture and the first fixture is a moveable fixture, the actuator acting on the first fixture.

7. The suspension damper test apparatus of claim 5, wherein the first prying device tilts the first bushing inner tube in a first prying angle and the first torsion device rotates the first bushing inner tube in a first torsion angle, and the second prying device tilts the second bushing inner tube in a second prying angle and the second torsion device rotates the second bushing inner tube in a second torsion angle.

8. The suspension damper test apparatus of claim 7, wherein the first prying device and the second prying device are configured such that the first prying angle and the second prying angle are in relation to each other in at least one plane.

9. The suspension damper test apparatus of claim 8, wherein the first torsion device and the second torsion device are configured such that the first torsion angle and the second torsion angle are in relation to each other in at least one plane.

10. A method of controlling a suspension damper test apparatus, the method comprising:
coupling a first end of a suspension damper to a first fixture of the suspension damper test apparatus, the first fixture including a force sensor, a first prying device, and a first torsion device;
coupling a second end of the suspension damper to a second fixture of the suspension damper test apparatus, the second fixture including a second prying device, a second torsion device, and at least one of a displacement sensor and a speed sensor;

tilting and rotating a first bushing inner tube relative to a first bushing outer tube at the first end of the suspension damper by the first prying device and the first torsion device;

tilting and rotating a second bushing inner tube relative to a second bushing outer tube at the second end of the suspension damper by the second prying device and the second torsion device;

moving by an actuator the suspension damper between an extended position and a compressed position in one of a sinusoidal wave form and a triangle wave form;

receiving by a controller in signal communication with the force sensor and the at least one of the displacement sensor and the speed sensor, at least one signal from at least one of the force sensor and the at least one of the displacement sensor and the speed sensor; and characterizing by the controller at least one friction value of the suspension damper based, at least in part, on the at least one signal received by the controller.

11. The method of claim 10, wherein tilting and rotating a first bushing inner tube relative to a first bushing outer tube comprises creating a first prying angle and a first torsion angle and tilting and rotating a second bushing inner tube relative to a second bushing outer tube comprises creating a second prying angle and a second torsion angle.

12. The method of claim 11, wherein the first prying device and the second prying device are configured such that the first prying angle and the second prying angle are in relation to each other in at least one plane.

13. The method of claim 12, wherein the first torsion device and the second torsion device are configured such that the first torsion angle and the second torsion angle are in relation to each other in at least one plane.

14. The method of claim 13, wherein the first fixture is a stationary fixture and the second fixture is a moveable fixture, the actuator acting on the second fixture.

15. The method of claim 13, wherein the second fixture is a stationary fixture and the first fixture is a moveable fixture, the actuator acting on the first fixture.

16. A control system for a suspension damper test apparatus, the control system comprising:
  a suspension damper test apparatus including:
    a first fixture including a force sensor, a first prying device, and a first torsion device, operatively coupled to a first end of a suspension damper;
    a second fixture including a second prying device, a second torsion device, and at least one of a displacement sensor and a speed sensor, operatively coupled to a second end of the suspension damper; and
    an actuator that actuates the suspension damper between an extended position and a compressed position in one of a sinusoidal wave form and a triangle wave form; and
  a controller in signal communication with the suspension damper test apparatus, the controller configured to:
  record signals from one or more of the force sensor and the at least one of the displacement sensor and the speed sensor, representative of a friction of the suspension damper while the suspension damper is actuated along a longitudinal axis of the suspension damper.

17. The control system of claim 16, wherein the first prying device is configured to tilt a first bushing inner tube relative to a first bushing outer tube at the first end of the suspension damper at a first tilt angle and the first torsion device is configured to rotate the first bushing inner tube relative to the first bushing outer tube at the first end of the suspension damper at a first rotation angle, and the second prying device is configured to tilt a second bushing inner tube relative to a second bushing outer tube at the second end of the suspension damper at a second tilt angle and the second torsion device is configured to rotate the second bushing inner tube relative to the second bushing outer tube at a second rotation angle.

18. The control system of claim 17, wherein the first prying device and the second prying device are configured such that the first prying angle and the second prying angle are in relation to each other in at least one plane.

19. The control system of claim 18, wherein the first torsion device and the second torsion device are configured such that the first torsion angle and the second torsion angle are in relation to each other in at least one plane.

20. The control system of claim 19, wherein the first fixture is a stationary fixture and the second fixture is a moveable fixture, the actuator acting on the second fixture.

21. A suspension damper test apparatus comprising:
  a first fixture including a force sensor and a prying device operatively coupled to a first end of a suspension damper;
  a second fixture including a torsion device a second prying device, and at least one of a displacement sensor and a speed sensor, operatively coupled to a second end of the suspension damper; and
  a controller in signal communication with the force sensor and the at least one of the displacement sensor and the speed sensor, the controller configured to record signals received from one or more of the force sensor and the at least one of the speed sensor and the displacement sensor, representative of a friction of the suspension damper while the suspension damper is actuated along a longitudinal axis of the suspension damper.

22. The suspension damper test apparatus of claim 21, wherein the prying device is configured to tilt a first bushing inner tube relative to a first bushing outer tube at the first end of the suspension damper, and the torsion device is configured to rotate a second bushing inner tube relative to a second bushing outer tube at the second end of the suspension damper.

23. The suspension damper test apparatus of claim 22, further comprising an actuator that actuates the suspension damper between an extended position and a compressed position in one of a sinusoidal wave form and a triangle wave form.

24. The suspension damper test apparatus of claim 23, wherein the first fixture is a stationary fixture and the second fixture is a moveable fixture, the actuator acting on the second fixture.

25. The suspension damper test apparatus of claim 23, wherein the second fixture is a stationary fixture and the first fixture is a moveable fixture, the actuator acting on the first fixture.

* * * * *